United States Patent [19]

Gomei

[11] Patent Number: 4,578,236

[45] Date of Patent: Mar. 25, 1986

[54] TORUS TYPE NUCLEAR FUSION APPARATUS USING DEUTERIUM OR TRITIUM AS FUEL

[75] Inventor: Yoshio Gomei, Yokohama, Japan

[73] Assignee: Tokyo Shibaura Denki Kabushiki Kaisha, Kawasaki, Japan

[21] Appl. No.: 377,015

[22] Filed: May 11, 1982

[30] Foreign Application Priority Data

May 21, 1981 [JP] Japan .................................. 56-75786

[51] Int. Cl.$^4$ .............................................. G21B 1/00
[52] U.S. Cl. ..................... 376/136; 376/134
[58] Field of Search ................................. 376/136, 134

[56] References Cited

U.S. PATENT DOCUMENTS

| 3,886,402 | 5/1975 | Furth et al. | 376/136 |
| 4,073,680 | 2/1978 | Kelly | 376/136 |
| 4,145,250 | 3/1979 | Ohkawa et al. | 376/150 |

FOREIGN PATENT DOCUMENTS

| 0025698 | 3/1976 | Japan | 376/136 |
| 1101698 | 9/1976 | Japan | 376/136 |
| 0019756 | 6/1978 | Japan | 376/136 |

OTHER PUBLICATIONS

CONF-750905-P2, 9/75, pp. 81-90, Shimomura Nuclear Fusion vol. 15, 1975, (AUG.), pp. 637-642, Toi: et al.
Nuclear Fusion vol. 21, Feb. 1981, No. 2, pp. 233-249, Cohen et al.
The Physics of Fluids, vol. 19, No. 10, Oct. 1976, pp. 1635-1640, Shimomura et al.
CONF-750905-P2, 9/75, pp. 91,92,93, FIG. 1.
Nuclear Fusion, vol. 18, p. 1619, "Divert or Experiment in DIVA" DIVA Group, 1980.

*Primary Examiner*—Harvey E. Behrend
*Attorney, Agent, or Firm*—Oblon, Fisher, Spivak, McClelland & Maier

[57] ABSTRACT

A torus type nuclear fusion apparatus including a main limiter for contacting plasma generated in a space enclosed by a first wall of a blanket and maintaining the shape of plasma stable, and a sub-limiter arranged between the first wall and the outer circumference of plasma to neutralize helium ion, a product of fusion reaction.

1 Claim, 2 Drawing Figures

TORUS TYPE NUCLEAR FUSION APPARATUS USING DEUTERIUM OR TRITIUM AS FUEL

BACKGROUND OF THE INVENTION

The present invention relates to a torus type nuclear fusion apparatus which uses deuterium or tritium as fuel. The apparatus has a means on a first wall of a blanket capable of generating torus type plasma in a plasma confinement region enclosed by the first wall and evacuating helium gas formed by neutralizing helium ion, a product of fusion reaction.

This type nuclear fusion apparatus is well known and makes it necessary for a limiter to be arranged on the first wall, contacting and stabilizing the plasma, and for deuterium or tritium to be supplied as fuel while evacuating helium ions, a product of nuclear fusion reaction, so as to stably maintain the nuclear fusion reaction for a long time.

In order to discharge helium ions, it is necessary to introduce helium ions into a room pumped by a evacuating pump and to neutralize the helium ions there to transform them to helium gas. The most usual way employed is to use diverters to generate a magnetic field, but a large space is needed to accommodate diverter coils in this case and the design of coils for forming magnetic field is not easy, too. It was therefore attempted that helium ions were was evacuated through a suction room without using diverters. Helium ions must also be neutralized in this case and it is therefore preferable to use a solid limiter. Conventionally, the solid limiter was attached to the first wall of the blanket and served to stably maintain plasma and to neutralize helium ions. Since a large amount of heat was exerted on the limiter, however, a strongly cooling means was needed to keep the temperature of the limiter in a safety range, thus making the whole of the nuclear fusion apparatus bulky.

SUMMARY OF THE INVENTION

The object of the present invention is to provide a torus type nuclear fusion apparatus in which helium particles, a nuclear fusion reaction product, can be evacuated under such a condition that a temperature rise of a limiter for maintaining plasma stable is suppressed to a lower level.

This object can be achieved by a torus type nuclear fusion apparatus comprising a main limiter arranged on a first wall to hold the shape of the plasma stable, and a sub-limiter arranged between the first wall and the outer circumference of the plasma to neutralize helium ions.

In contrast to the conventional apparatus in which a single limiter was employed to stabilize plasma as well as to neutralize helium ions, the torus type nuclear fusion apparatus of the present invention employs main and sub-limiters, one for the stabilization of plasma and the other for the neutralization of helium ions. Thus it can effectively evacuated helium particles under such condition as to alleviate heat loading into the sub-limiter.

DETAILED DESCRIPTION OF THE PREFERRED EMBODIMENT

Figure 1:
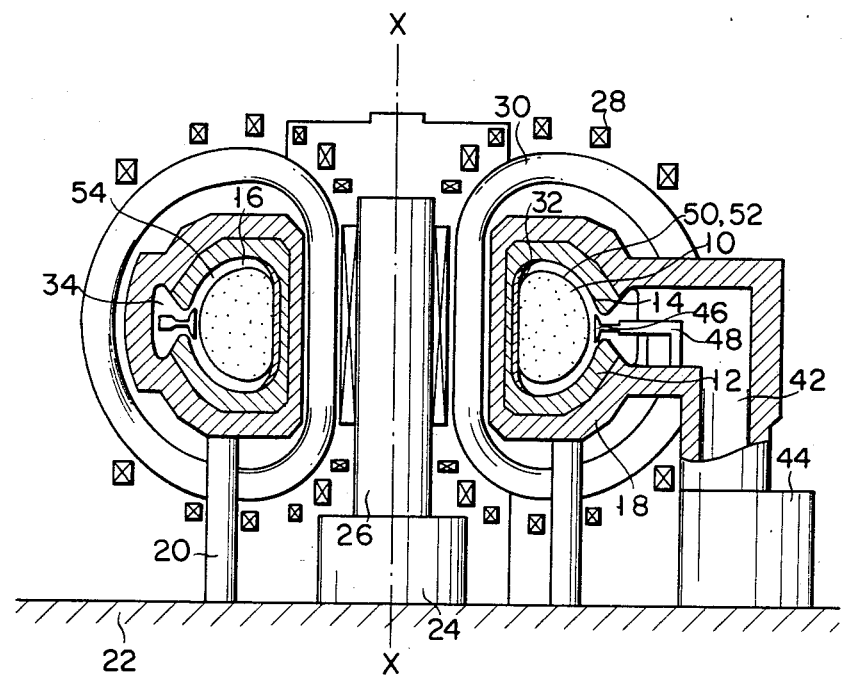
FIG. 1 is a partially sectioned view showing the main portion of a torus type nuclear fusion apparatus according to the present invention.

FIG. 1 is a partially sectioned view showing the main portion of a torus type nuclear fusion apparatus according to the present invention. Torus type plasma 10 is formed in a torus type space 16 enclosed by a first wall 14 of a blanket 12 in a plasma container. The blanket 12 is enclosed and supported by a housing 18 for shielding heat and radio-active rays emitted from the plasma 10, and the housing 18 is stably supported above the floor 22 by supporting legs 20. An iron core 26 is erected, coaxial with the principal axis or torus axis X-X of the apparatus, from a base 24 on the floor 22, and poroidal coils 28 are arranged around the iron core 26, taking this iron core 26 as its center. A toroidal coil 30 is wound around the housing 18 or plasma 10, passing between the iron core 26 and the housing 18. A main limiter 32 made of high melting point material such as molybdenum and having a large heat capacity is attached to the first wall 14 on the principal axis X-X side or inner side of space 16, covering a large area thereof, and the density of plasma being high and a large quantity of heat being stored on the principal axis X-X side or inner side of space 16. A gas evacuating annular channel 34 is provided inside the first wall 14, blanket 12 and housing 18 on the outer side of space 16 remote from the principal axis X-X. The annular channel 34 is communicated with the space 16 through an annular slit 40 and connected to a gas evacuating pump 44 through a flow path 42. A leg portion 48 erected inside the flow path 42 has a diameter smaller than the width of the annular slit 40 and projects into the space 16 through the annular slit 40. A plate-shaped sub-limiter 46, extending along the first wall 14, is attached to the foremost end of leg portion 48 projected into the space 16 (see FIG. 2). The space 16 is communicated with an evacuating flow path provided between the annular slit 40 and the leg portion 48, annular channel 34, flow path 42 and gas evacuating pump 44.

Figure 2:
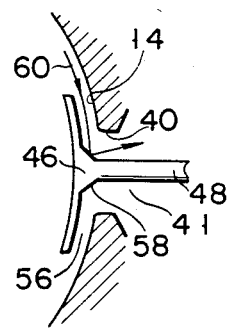
FIG. 2 is an enlarged view showing in detail a sub-limiter used in the apparatus of FIG. 1.

The operation of torus type nuclear fusion apparatus according to the present invention will be roughly described referring to FIGS. 1 and 2. When power is supplied to the toroidal coil 30 to generate a toroidal magnetic field in the torus type space 16, an electric field is excited through the iron core 26 in the sub-axial direction of torus and plasma 10 is generated by current flowing due to this electric field. When power is supplied to the poroidal coil 28 at the same time that power supplied to the toroidal coil 30, plasma 10 is confined inside a magnetic face 52 due to poroidal and toroidal magnetic fields caused by both coils 28 and 30. The main limiter 32 serves to absorb a large amount of heat from plasma 10, contacting with it, to hold its shape stable and to neutralize a part of the helium ions caused as a result of fusion reaction. Remaining helium ions are introduced to and neutralized by the sub-limiter 46 which will be described later. Heat is exerted from said remaining helium ions to the sub-limiter 46.

As seen in FIG. 1, the shape of plasma 10 is maintained stable by contacting with the main limiter 32 and it may be considered that the sectioned circumference of plasma 10 corresponds to the magnetic face 52 which confines plasma 10 therein. Since the sublimiter 46 attached to the foremost end of leg portion 48 is located along the magnetic face 52 and between the outer circumference of plasma 10 and the first wall 14, said remaining helium ions are diffused in the direction to the first wall 14 and guided toward the sub-limiter 46 along the toroidal magnetic field through a ring-shaped flow path 54 which is formed between the magnetic face 52 and the first wall 14 along the whole outer circumference of plasma 10. The main limiter 32 is formed to cover a large area on the first wall 14 and heat exerted on the main limiter 32 is reduced by an amount corresponding to heat exerted on the sub-limiter 46, so that the temperature rise of main limiter 32 can be suppressed to a larger extent as compared with the conventional apparatus in which a single limiter was employed. The evacuating pump 44 is usually operated to evacuate gas in the space 16 through the annular channel 34 when the nuclear fusion apparatus is working. Therefore, helium ions moved through the ring-shaped flow path 54 are passed through a guiding flow path 56 between the first wall 14 and the sub-limiter 46, neutralized by colliding against a slope 58 formed at the connecting portion between the sub-limiter 46 and the leg portion 48, reflected in a direction shown by an arrow 60 and evacuated by the pump 44 through the evacuating flow path 41, annular channel 34 and flow path 42.

As described above, the torus type nuclear fusion apparatus according to the present invention employs two limiters, one for the stable maintenance of plasma and the other for the neutralization of helium ions. Therefore, heat from plasma and helium ions is not concentrated to a single limiter as seen in the conventional apparatus, but dispersed to two limiters, thus allowing the temperature rise of the main limiter to be suppressed in a safety range and helium ions to be neutralized without using any cooling means of extremely large capacity. The present invention can provide therefore a torus type nuclear fusion apparatus relatively simpler and smaller in size and capable of suppressing the temperature rise.

I claim:

1. A toroidal nuclear fusion apparatus which uses deuterium or tritium as fuel and which generates a toroidally shaped plasma in a space enclosed by a first wall, said apparatus comprising:
   (a) a first wall enclosing a toroidally shaped space which is symmetrical about a centrally located principal axis;
   (b) means for producing a toroidally shaped plasma from deuterium or tritium in said toroidally shaped space, said toroidally shaped plasma being symmetrical about said principal axis;
   (c) a main limiter made of high melting point material and having a large heat capacity, at least substantially the entirety of said main limiter being attached to said first wall on the surface of said first wall adjacent to said centrally located principal axis;
   (d) a gas evacuating annular channel provided inside said first wall, said gas evacuating annular channel being symmetrical about said principal axis and being located radially outwardly of said toroidally shaped space with respect to said centrally located principal axis;
   (e) an annular slit providing fluid communication between said toroidally shaped space and said gas evacuating annular channel;
   (f) an annular sub-limiter which neutralizes helium ions produced during operation of the nuclear fusion apparatus by transforming the helium ions into helium gas, said annular sub-limiter comprising a ring-shaped plate member disposed in said toroidally shaped space in front of said annular slit, the width of said ring-shaped plate exceeding the width of said annular slit and said ring-shaped plate being spaced from said first wall to define a helium ion guiding and flowing path between said annular sub-limiter and said first wall;
   (g) a gas evacuating pump;
   (h) a conduit defining a flow path between said gas evacuating annular channel and said gas evacuating pump; and
   (i) a supporting leg for said annular sublimiter, said supporting leg being mounted on the inside of said conduit, extending through said annular slit, and being attached to the surface of said annular sub-limiter which is radially outward with respect to said centrally located principal axis, said supporting leg having a width which is less than the width of said annular slit, whereby an evacuating path for helium ions is formed between the walls of said annular slit and the adjacent surfaces of said supporting leg, the connecting portion between said supporting leg and said annular sub-limiter being provided with a slope which reflects helium ions which have passed through said helium ion guiding and flowing path between said annular sub-limiter and said first wall outwardly into said gas evacuating annular channel.

* * * * *